(12) United States Patent
Okuda

(10) Patent No.: US 6,459,887 B2
(45) Date of Patent: Oct. 1, 2002

(54) FOLDABLE PORTABLE TELEPHONE

(75) Inventor: Tatsumi Okuda, Motosu-gun (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/795,450

(22) Filed: Mar. 1, 2001

(30) Foreign Application Priority Data

| Mar. 3, 2000 | (JP) | 2000-058088 |
| Mar. 3, 2000 | (JP) | 2000-058089 |
| Mar. 3, 2000 | (JP) | 2000-058090 |
| Mar. 3, 2000 | (JP) | 2000-058091 |

(51) Int. Cl.[7] .................................. H04B 1/38
(52) U.S. Cl. ............ 455/90; 455/575; 379/433.13; 16/326; 16/342; 16/284
(58) Field of Search .................. 455/575, 90, 550; 379/428, 433, 428.01, 433.01, 433.11, 433.13; D14/137, 138, 140; 16/321, 326, 371, 374, 232, 342, 330, 284, 294

(56) References Cited

U.S. PATENT DOCUMENTS

| 5,259,019 A | * | 11/1993 | Stilley | 455/575 |
| 5,649,309 A | * | 7/1997 | Wilcox et al. | 455/90 |
| 5,689,824 A | * | 11/1997 | Nagai | 455/575 |
| 5,742,912 A | * | 4/1998 | Nishiyama et al. | 455/550 |
| 5,923,751 A | * | 7/1999 | Ohtsuka et al. | 379/433 |
| 6,151,486 A | * | 11/2000 | Holshouser et al. | 455/90 |

* cited by examiner

Primary Examiner—Doris H. To
(74) Attorney, Agent, or Firm—Armstrong, Westerman & Hattori, LLP.

(57) ABSTRACT

A foldable portable telephone of the invention comprises a main body case 1, and a closure case 2 connected to the case 1 by a pair of hinge mechanisms 10, 10'. On the hinge mechanisms, 10, comprises cylindrical barrel portions 13, 22 provided respectively on the main body case 1 and the closure case 2, and a hinge assembly 4 inserted through the barrel portions. The hinge assembly 4 comprises a main body drive member in engagement with the barrel portion 13 on the main body case 1 nonrotatably relative thereto, a closure drive member in engagement with the barrel portion 22 on the closure case 2 nonrotatably relative thereto, a prime mover spring for rotating the closure drive member in a direction to open the closure case 2, a holding mechanism for holding the closure case 2 in a closed position, a manual button 41 to be manipulated to open the closure case 2, and a hold release mechanism for releasing the holding mechanism from the holding state in response to the manipulation of the manual button. The closure case can be opened easily at the touch of the manual button even when the closure case has a relatively great weight.

17 Claims, 15 Drawing Sheets

FOLDABLE PORTABLE TELEPHONE

FIELD OF THE INVENTION

The present invention relates to foldable portable telephones comprising a main body case provided with a plurality of manual keys, and a closure case connected to the main body case openably, and more particularly to such a foldable portable telephone wherein the closure case can be opened easily at the touch of a button.

BACKGROUND OF THE INVENTION

FIGS. 17 and 18 show a foldable portable telephone which is already known and which comprises a main body case provided with a plurality of manual keys, and a closure case provided with a display and openably connected to the main body case. A pair of opposite hinge mechanisms are arranged at the junction of the main body case and the closure case, and the closure case can be opened or closed about an axis of rotation of the hinge mechanisms. One of the hinge mechanisms comprises a first barrel portion provided on the main body case, a first barrel portion provided on the closure case and aligned with the barrel portion, and a hinge pin fitted in the barrel portions centrally thereof. Similarly, the other hinge mechanism comprises a second barrel portion provided on the main body case, a second barrel portion provided on the closure case and aligned with the barrel portion, and a hinge pin fitted in the barrel portions centrally thereof.

When to be carried the foldable portable telephone described can be compacted by folding the closure case and is therefore not only convenient to carry but also can be free of the likelihood that the manual key will be depressed while in a bag or the like since the keys are covered with the closure case, hence safety. Further because the screen of the display is accommodated in the closure case as closed, the display can be protected from damage even if the portable telephone slips off to fall.

The foldable portable telephone shown in FIGS. 17 and 18 has recessed portions and recessed portions formed respectively in the main body case and the closure case at opposite sides thereof. The closure case closed as shown in FIG. 17 can be opened as shown in FIG. 18 by inserting the tip of a finger between the opposed pair of recessed portions forming a space as shown in FIG. 17. The closure case is thus openable by only one hand grasping the main body case, hence convenience.

However, when the finger tip is merely inserted between the main body case and the closure case to open the closure case of the conventional telephone shown in FIGS. 17 and 18, it is only to an intermediate position that the closure case can be opened, and the closure case opened to the intermediate position must be further pushed open in order to open the closure case to the full-open position shown in FIG. 18 The telephone has the problem that this procedure is difficult. Especially when the closure case has an increased weight due to the provision of the display which is large-sized, difficulty is encountered in opening the closure case with the finger tip.

Suppose the telephone has a spring for biasing the closure case toward an opening direction relative to the main body case, a latch slidably mounted on a side face of the main body case as shown in FIG. 19, a hook provided on the closure case, and a spring connected to the latch on the main body case, with a manual piece interposed therebetween. The closure case can then be made automatically openable merely by moving the manual piece, whereas it becomes necessary to provide the latch, hook, manual piece, spring, etc. in addition to the hinge mechanism. This entails the problem of making the telephone large-sized and complex to assemble. Further because the force of the spring biasing the closure case toward the opening direction when the case in its closed position is received by the latch and the hook provided on the respective cases, these cases are subjected directly to the force, which is likely to deform the cases. Furthermore, the latch and the hook each have a projection of acute angle and therefore have the problem of being hazardous.

Although the conventional foldable portable telephone is so adapted that the closure case can be held in two postures of different angles, i.e., in the fully closed position and the full-open position, it is desired that the closure case be holdable also in one or more intermediate positions so as to be positionable in a posture of desired angle for use.

SUMMARY OF THE INVENTION

A first object of the present invention is to provide a foldable portable telephone having a closure case which can be easily opened at the touch of a button.

To fulfill the first object, the present invention provides a foldable portable telephone which comprises a main body case provided with a plurality of manual keys, and a closure case connected to the main body case by a hinge mechanism for covering the manual keys, the hinge mechanism comprising:

a main body drive member in engagement with a barrel portion on the main body case and nonrotatable relative thereto, a closure drive member in engagement with a barrel portion the closure case and nonrotatable relative thereto, a prime mover mechanism provided between the main body drive member and the closure drive member for exerting a force for rotating the closure drive member in a direction to open the closure case, a holding mechanism for holding the closure case closed in a closed position, a manual button exposed to outside from the barrel portions on the main body case and the closure case and to be manipulated to open the closure case, and a hold release mechanism for releasing the holding mechanism from the holding state in response to the manipulation of the manual button.

When the closure case of the telephone of the invention described is in a closed state, the holding mechanism is in operation to hold the closure case in the closed position. When the manual button is manipulated to open the closure case, the holding mechanism is released from the holding state, consequently initiating the prime mover mechanism into operation. This rotates the closure drive member, opening the closure case to a full-open position. When the closure case is to be closed, the case is pushed in a closing direction against a force exerted by the prime mover mechanism, whereby the case is rotated to the closed position. During this process, the holding mechanism functions to hold the closure case in the closed position.

Stated more specifically, a cam mechanism is formed in engaging portions of the main body drive member and the closure drive member, and an elastic member is provided between the main body drive member and the closure drive member for exerting a force for rotating the closure drive member in the closure case opening direction. The cam mechanism has a first cam curve portion and a second cam curve portion operable respectively in the first half and the second half of the process of rotation of the closure case from the closed position to an open position. The first cam curve portion is in the form of a cam curve capable of rotating the closure drive member in a direction to close the closure case with the force exerted by the elastic member. The second cam curve portion is in the form of a cam curve capable of rotating the closure drive member in the closure case opening direction with the force exerted by the elastic member. Thus, the first cam curve portion and the elastic member provide the holding mechanism, and the second cam curve portion and the elastic member provide the prime mover mechanism.

When the closure case is in the closed state in the specific construction described, the first cam portion of the cam mechanism is in operation, holding the closure case in its closed position with the force exerted by the elastic member. The cam mechanism is changed over from the first cam curve portion operating state to the second cam curve portion operating state by manipulating the manual button in this state. The operation of the second cam curve portion biases the closure drive member into rotation toward the closure case opening direction to open the closure case to the full-open position.

When the closure case is pushed toward the closing direction from the full-open position, the first cam curve portion is brought into operation, with the second cam curve portion driven in the opposite direction, whereby the closure drive member is biased into rotation in the closure case closing direction to close the closure case to the fully closed position.

The present invention provides a foldable portable telephone which comprises a main body case provided with manual keys, and a closure case connected to the main body case by a pair of hinge mechanisms arranged in alignment for covering the manual keys. One of the hinge mechanisms has the same construction as described above. Accordingly, the closure case can be opened merely by manipulating the manual button of the above-mentioned one hinge mechanism.

Further stated more specifically, the main body case and the closure case are provided respectively with cylindrical barrel portions arranged in alignment with each other, and the main body drive member, closure drive member, prime mover mechanism, holding mechanism, manual button and hold release mechanism which constitute the above-mentioned one hinge mechanism are brought together into a hinge assembly in the form of a round rod, the hinge assembly being fitted into the barrel portions on the main body case 1 and the closure case. The main body drive member is in engagement with the barrel portion on the main body case nonrotatably relative thereto, while the closure drive member is in engagement with the barrel portion on the closure case nonrotatably relative thereto. The manual button is exposed to outside from the barrel portions. With the specific construction described, the main body case and the closure case can be connected together by preparing the hinge assembly as a single unit and fitting the hinge assembly into the barrel portions 13, 22 of the main body case and the closure case. This assures a simplified assembling procedure.

The closure case can be opened to the full-open position at the touch of the manual button, i.e., simply by manipulating the button, so that the foldable portable telephone of the present invention described is easy to use.

A second object of the present invention is to provide a foldable portable telephone having a closure case which is easy to open at the touch of manual buttons even when the closure case has a relatively great weight.

To fulfill the second object, the present invention provides a foldable portable telephone comprising a main body case provided with a plurality of manual keys, and a closure case connected to the main body case by a pair of hinge mechanisms arranged in alignment for covering the manual keys. Each of the hinge mechanisms comprises:

a main body drive member connected to an end portion of the main body case and rotatable with the main body case, a closure drive member connected to an end portion of the closure case and rotatable with the closure case, a prime mover mechanism provided between the main body drive member and the closure drive member for exerting a force for rotating the closure drive member in a direction to open the closure case, a holding mechanism for holding the closure case closed in a closed position, a manual button to be manipulated to open the closure case, and a hold release mechanism for releasing the holding mechanism from the holding state in response to the manipulation of the manual button.

When the closure case of the telephone of the invention described is in a closed state, the holding mechanisms of the hinge mechanisms are in operation to hold the closure case in the closed position. When the manual buttons of the hinge mechanisms are manipulated at the same time to open the closure case, the holding mechanisms are released from the holding state, consequently initiating the prime mover mechanisms of the hinge mechanisms into operation. This rotates the closure drive members of the hinge mechanisms at the same time, opening the closure case to a full-open position. When the closure case is to be closed, the case is pushed in a closing direction against the force exerted by the prime mover mechanisms of the hinge mechanisms whereby the case is rotated to the closed position. During this process, the holding mechanisms of the hinge mechanisms function to hold the closure case in the closed position.

The closure case can be opened to the full-open position at the touch of the manual buttons i.e., simply by manipulating the buttons, so that the foldable portable telephone of the present invention described is easy to use. Since the two prime mover mechanisms (elastic members) provided in the pair of hinge mechanisms exert forces to open the closure case, the closure case, even if having a relatively great weight, can be opened with a sufficiently great force which is uniform widthwise of the case.

A third object of the present invention is to provide a foldable portable telephone having a closure case which can be opened at the touch of a manual button and which is adapted to reduce the impact produced by opening the closure case even when the closure case has a relatively great weight.

To fulfill the third object, the present invention provides a foldable portable telephone comprising a main body case provided with manual keys, and a closure case connected to the main body case by a pair of hinge mechanisms arranged in alignment for covering the manual keys.

At least one of the hinge mechanisms comprises:

a main body drive member connected to an end portion of the main body case and rotatable with the main body case, a closure drive member connected to an end portion of the closure case and rotatable with the closure case, a prime mover mechanism provided between the main body drive member and the closure drive member for exerting a force for rotating the closure drive member in a direction to open the closure case, a holding mechanism for holding the closure case closed in a closed position, a manual button to be manipulated to open the closure case, a hold release mechanism for releasing the holding mechanism from the holding state in response to the manipulation of the manual button, and a damper mechanism for applying a braking force to the rotation of the closure case in the second half of the process of opening the closure case.

When the closure case of the foldable portable telephone of the invention is in the closed state, the holding mechanism operates to hold the closure case in the closed position. When the manual button is manipulated to open the closure case, the case is released from the holding state by the holding mechanism, with the result that the prime mover mechanism is initiated into operation. This rotates the closure drive member, opening the closure case to a full-open position. In the second half of the process of opening the closure case, the damper mechanism operates, applying a braking force to the rotation of the closure drive member relative to the main body drive member to reduce the opening speed of the closure case and consequently reducing the impact to be produced when the closure case is brought to the full-open position. When the closure case is to be closed, the case is pressed in the closing direction against the force exerted by the prime mover mechanism, whereby the case is rotated to the closed position. The holding mechanism operates in this process to hold the closure case in the closed position.

The present invention further provides a foldable portable telephone comprising a main body case provided with manual keys, and a closure case connected to the main body case by a pair of hinge mechanisms arranged in alignment for covering the manual keys. At least one of the hinge mechanisms has the construction of the invention described above. Accordingly, the closure case can be opened by manipulating the manual button of the hinge mechanism.

Stated more specifically, one of two members movable relative to each other with the opening movement of the closure case is provided with a frictional resistance portion slidable in contact with the other member to provide the damper mechanism. With this specific construction, the other member comes into sliding contact with the frictional resistance portion provided on the above-mentioned one member in the second half of the process of opening the closure case to reduce the opening speed of the case.

The foldable portable telephone of the invention described is not only so adapted that the closure case can be opened to the full-open position at the touch of the manual button but the impact to be produced upon the closure case reaching the full-open position can also be reduced.

A fourth object of the present invention is to provide a foldable portable telephone having a closure case which can be opened easily at the touch of a manual button and which can be opened to different adjusted angles.

To fulfill the fourth object, the present invention provides a foldable portable telephone comprising a main body case 1 provided with manual keys, and a closure case connected to the main body case by a hinge mechanism for covering the manual keys. The hinge mechanism comprises:

a main body drive member connected to an end portion of the main body case and rotatable with the main body case, a closure drive member connected to an end portion of the closure case and rotatable with the closure case, a prime mover mechanism provided between the main body drive member and the closure drive member for exerting a force for rotating the closure drive member in a direction to open the closure case, a holding mechanism for holding the closure case closed in a closed position, a manual button to be manipulated to open the closure case, a hold release mechanism for releasing the holding mechanism from the holding state in response to the manipulation of the manual button, and an opening angle adjusting mechanism for holding the closure case at one or a plurality of opening angles in the process of closing the closure case from a full-open position.

When the closure case of the foldable portable telephone of the invention is in the closed state, the holding mechanism operates to hold the closure case in the closed position. When the manual button is manipulated to open the closure case, the case is released from the holding mechanism, with the result that the prime mover mechanism is initiated into operation. This rotates the closure drive member, opening the closure case to a full-open position. When the closure case is to be closed, the case is pressed in the closing direction against the force exerted by the prime mover mechanism, whereby the case is rotated to the closed position. The opening angle adjusting mechanism operates in this process to hold the case at one or more opening angles. When the closure case is further pressed in the closing direction, the holding mechanism operates to hold the case in a fully closed position.

With the foldable portable telephone of the invention described, the closure case can be opened not only to the full-open position at the touch of the manual button but also to different adjusted angles.

DETAILED DESCRIPTION OF EMBODIMENTS

Foldable portable telephones according to the invention will be described below in detail with reference to the drawings.

First Embodiment

Figure 1:
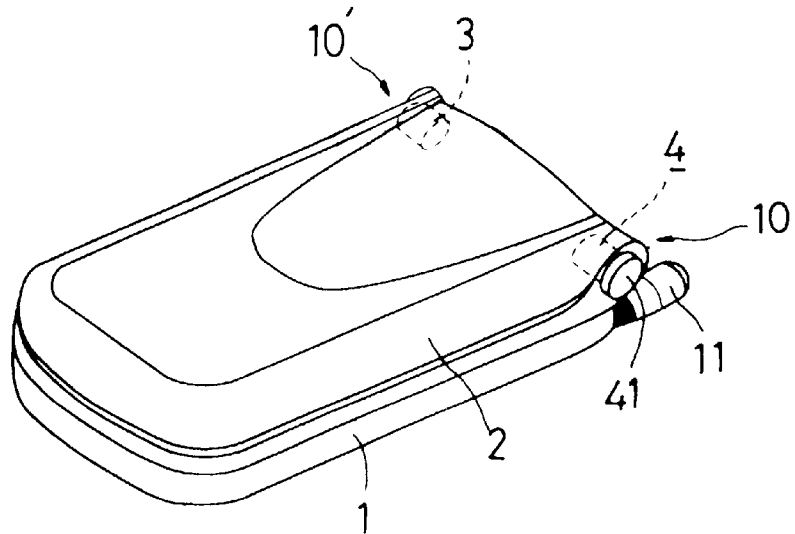
FIG. 1 is a perspective view of a foldable portable telephone as a first embodiment, with a closure case closed.
Figure 2:
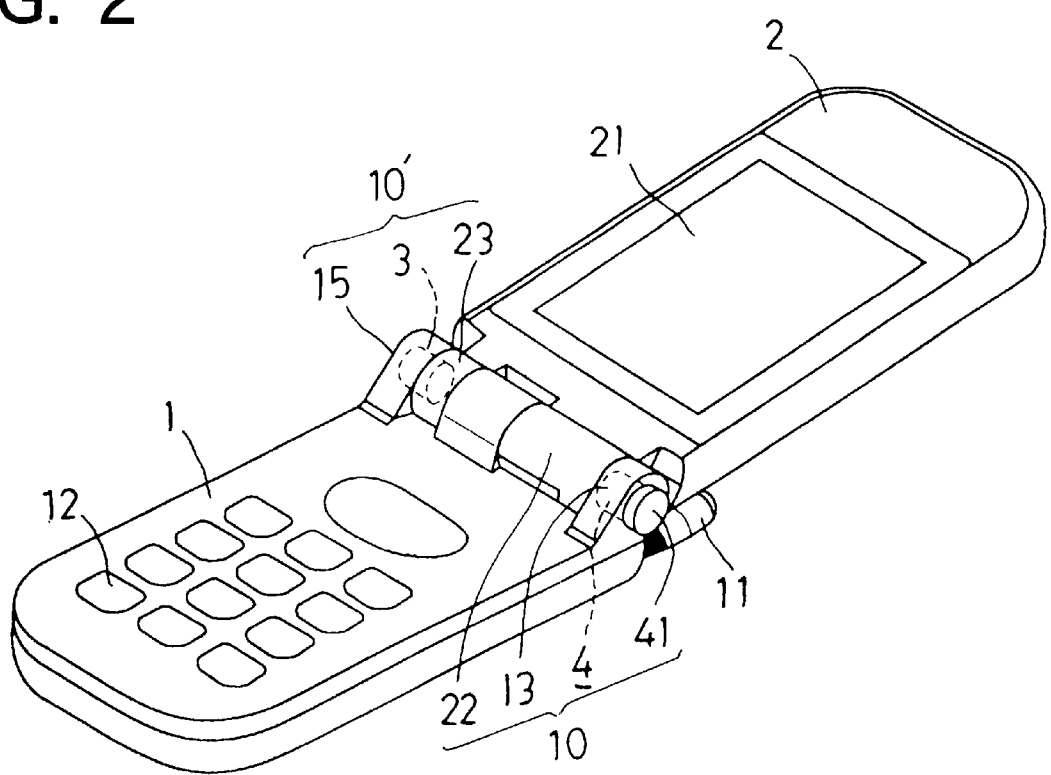
FIG. 2 is a perspective view of the foldable portable telephone of the first embodiment, with the closure case opened.
Figure 3:
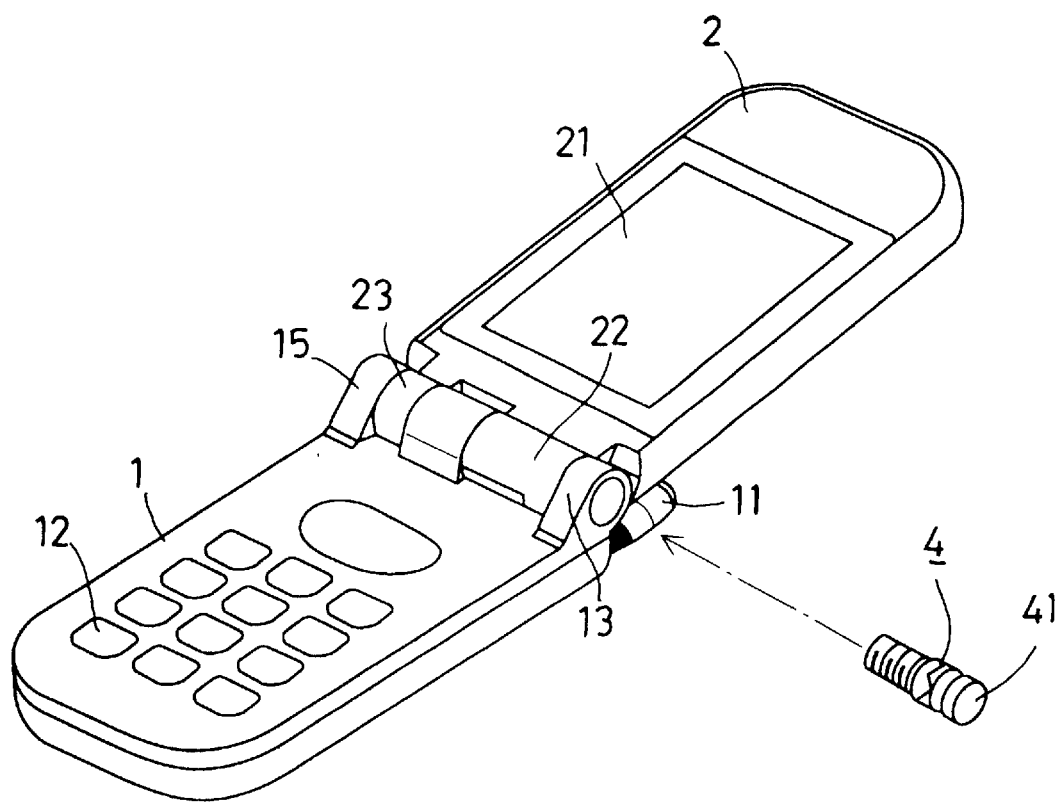
FIG. 3 is a perspective view of the foldable portable telephone of the first embodiment, with a hinge assembly separated therefrom.

FIGS. 1 to 3 show a foldable portable telephone of the present invention, which comprises a main body case 1 provided with manual keys 12, and a closure case 2 having a display 21 and openably connected to the main body case 1. arranged at the junction of the main body case 1 and the closure case 2 are a hinge mechanism 10 positioned at the right side and embodying the invention, and a hinge mechanism 10', like a conventional one, positioned at the left side. The closure case 2 can be opened or closed about the axis of rotation of the two hinge mechanisms 10, 10'. The main body case 1 is provided with an extensible antenna 11. In the following description, the terms left and right are used with reference to the telephone as positioned in the usual posture for use.

The hinge mechanism 10 at the right comprises a first barrel portion 13 provided on the main body case 1, a first barrel portion 22 provided on the closure case 2 and aligned with the barrel portion 13, and a hinge assembly 4 fitted in the central bores of the two barrel portions 13, 22. The hinge assembly 4 has a manual button 41 exposed to the outside from the first barrel portion 13. The hinge mechanism 10' at the left comprises a second barrel portion 15 provided on the main body case 1, a second barrel portion 23 provided on the closure case 2 and aligned with the barrel portion 15, and a hinge pin 3 fitted in the central bores of the two barrel portions 15, 23.

Figure 4:
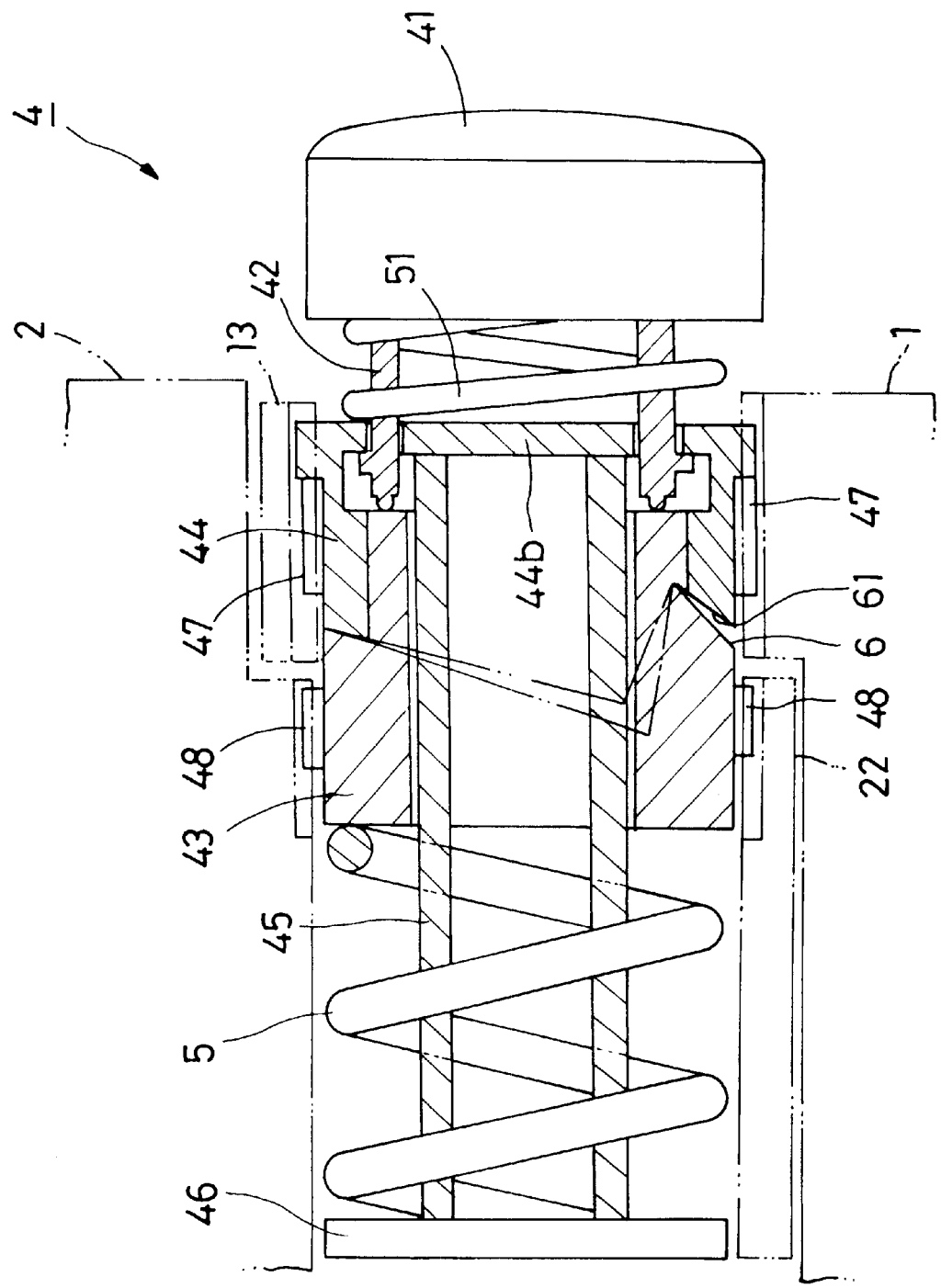
FIG. 4 is an enlarged front view partly broken away and showing the hinge assembly of the first embodiment.

As shown in FIG. 4, the hinge assembly 4 is in the form of a round rod in its entirety and comprises a closure drive member 43 and a main body drive member 44 which are each in the form of a hollow cylinder, arranged coaxially, and engaged with each other, axially movably relative to each other and rotatably relative to each other. Cam faces 6, 61 slidable in contact with each other are formed in opposed portions of the closure drive member 43 and the main body drive member 44.

The closure drive member 43 is provided on its outer periphery with a pair of projections 48, 48 which are circumferentially spaced apart by a predetermined angle and engaged in the inner periphery of the first barrel portion 22 on the closure case 2, whereby the closure drive member 43 is made rotatable with the closure case 2. Further the main body drive member 44 is provided on its outer periphery with a pair of projections 47, 47 which are circumferentially spaced apart by a predetermined angle and engaged in the inner periphery of the first barrel portion 13 on the main body case 1, whereby the main body drive member 44 is made rotatable with the main body case 1.

Figure 5:
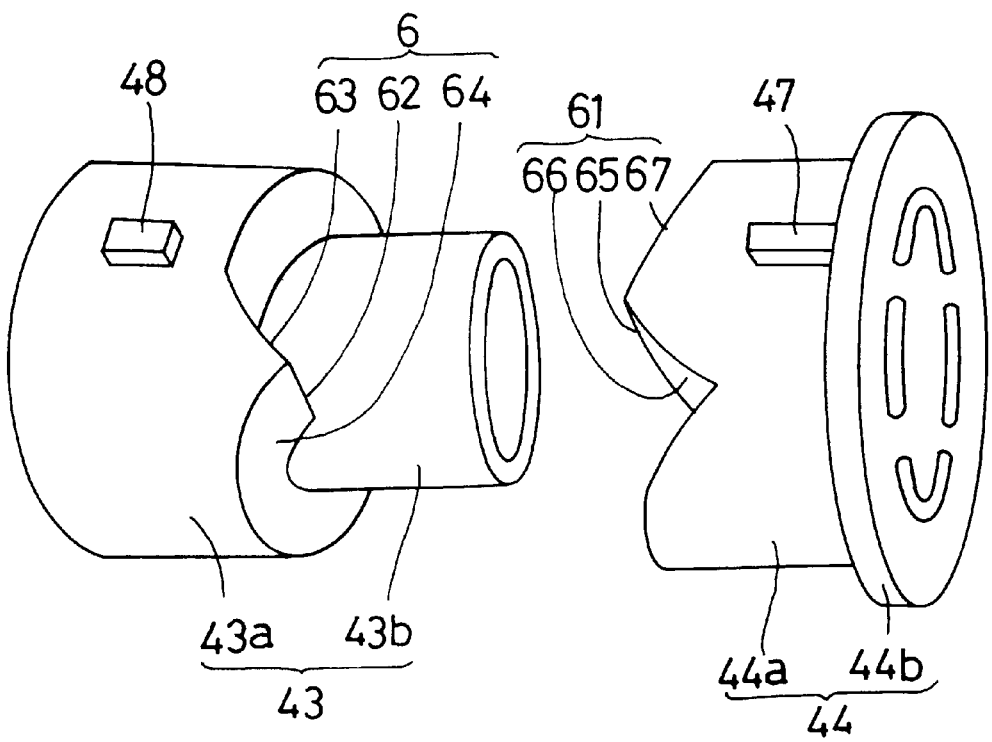
FIG. 5 is an exploded perspective view of a closure drive member and a main body drive member.

With reference to FIG. 5, the closure drive member 43 comprises a first tubular portion 43a of large diameter and a second tubular portion 43b having a small diameter and coaxial with the tubular portion 43a. The first tubular portion 43a has a right end face providing the cam face 6. The cam face 6 on the closure side has a cam portion including slopes 63, 64 at opposite sides of a ridge 62. On the other hand, the main body drive member 44 comprises a tubular portion 44a having the same diameter as the first tubular portion 43a of the closure drive member 43, and a flange 44b in the form of a disk provided at the right end of the tubular portion 44a. The tubular portion 44a has a left end face providing the cam face 61. The cam face 61 on the main body side has a cam portion including slopes 66, 67 at opposite sides of a ridge 65.

With reference to FIG. 4, a shank 45 extends leftward from the left side face of the flange 44b of the main body drive member 44. A flange 46 in the form of a disk is provided at the left end of the shank 45. Provided around the shank 45 is a prime mover spring 5 having a left end secured to the flange 46 of the shank 45 and a right end secured to the closure drive member 43. Consequently, the spring 5 exerts an axial elastic biasing force, bringing the closure side cam face 6 and the main body side cam face 61 into pressing contact with each other axially of the hinge assembly 4 and biasing the closure drive member 43 into rotation toward a direction to open the closure case 2.

A tubular member 42 extends through the flange 44b of the main body drive member 44. The tubular member 42 has a right end with the manual button 41 fixed thereto and a left end slidably in contact with the closure drive member 43. An auxiliary coil spring 51 is fitted around the tubular member 42 for biasing the button 41 in a projecting direction, whereby the button 41 is held projected in a free state.

Figure 6:
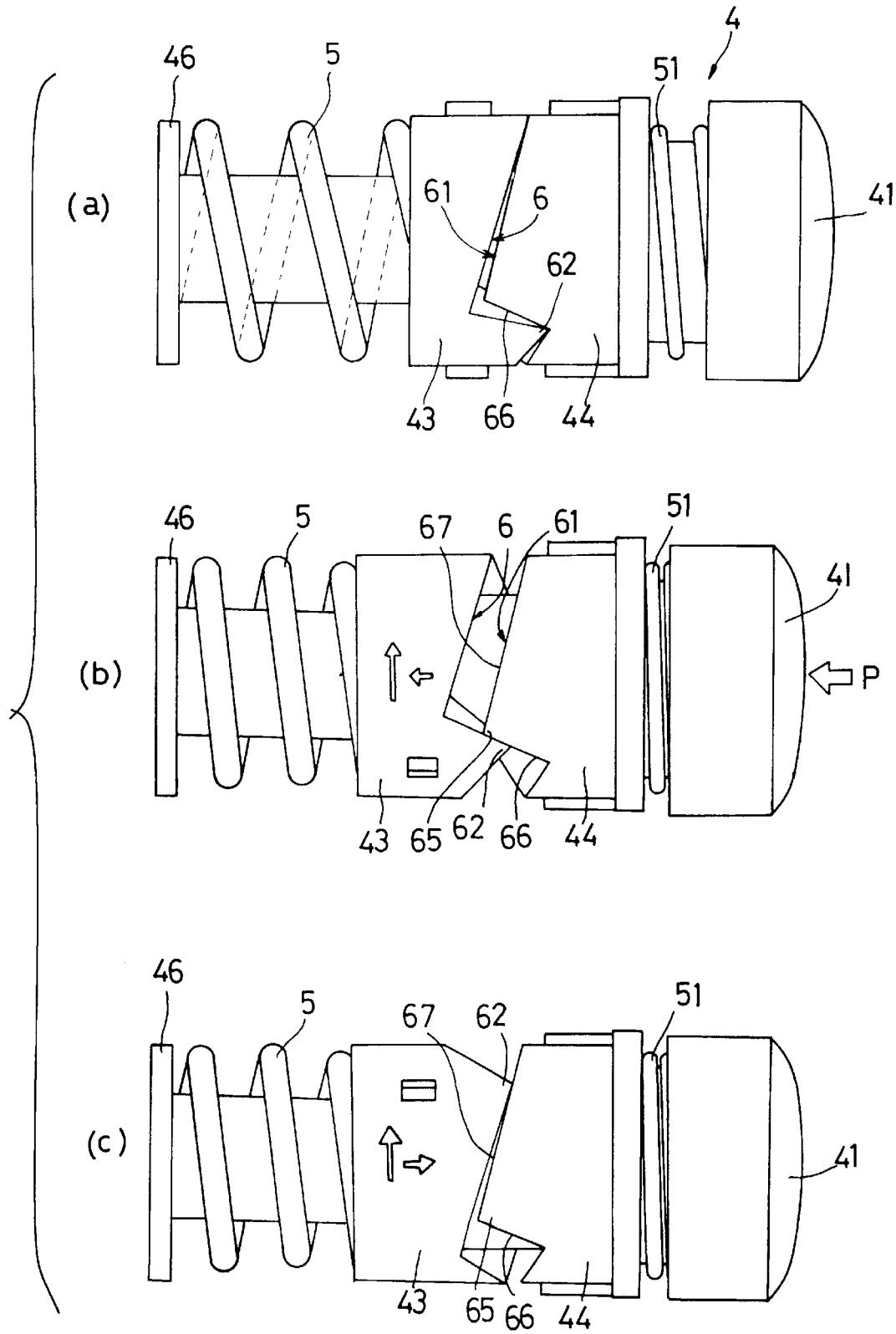
FIG. 6 includes a series of front views for illustrating the operation of the hinge assembly.

When the closure case 2 of the telephone of the present embodiment is held closed, the closure side cam face 6 and the main body side cam face 61 are in the deepest engagement with each other as seen in FIG. 6(a), that is, the ridge 62 of the cam face 6 is engaged in the deepest portion of the cam face 61. While the prime mover spring 5 exerts an axial elastic biasing force and an elastic biasing force in a direction of rotation, the former force is predominant, holding the cam face 6 in engagement with the cam face 61 and therefore holding the closure drive member 43 out of rotation, whereby the closure case 2 is held in the closed position. If the position of the members 43, 44 relative to each other is so adjusted that the ridge 62 of the cam face 6 is slidably in contact with the slope 66 of the cam face 61 at a portion thereof slightly away from the deepest portion of the cam face 61, with the closure case 2 in its closed state, the closure drive member 43 will be subjected to a rotational biasing force in the closure case closing direction when the case 2 is in the closed state owing to the axial biasing force of the primer mover spring 5 and to the action of the slope 66 of the cam face 61. The closure case 2 will then be closed as pressed into contact with the main body case 1. This provides a reliable closed state.

When the manual button 41 is pressed against the forces of the prime mover spring 5 and the auxiliary spring 51 as shown in FIG. 6(b) to open the closure case 2, the pressure P is delivered to the closure drive member 43, moving the member 43 away from the main body drive member 44. The closure drive member 43 is biased into rotation by the spring 5 and is therefore rotated in a direction to open the closure case 2 with the axial movement. As a result, the ridge 62 of the cam face 6 moves over the ridge 65 of the cam face 61 after ascending the slope 66 thereof, whereupon the closure drive member 43 is subjected to a torque acting in the closure case opening direction by the axial force of the spring 5 and the cam action of the slope 67 of the cam face 61 as shown in FIG. 6(c) even if the button 41 is thereafter released from the hand. The closure case 2 is opened to a full-open position.

When the closure case 2 is to be closed, the closure case 2 is pressed toward the closing direction against the elastic biasing force of the spring 5 in the direction of rotation. This causes the ridge 62 of the cam face 6 to ascent the slope 67 of the cam face 61. After the ridge 62 of the cam face 6 has moved over the ridge 65 of the cam face 61, the closure drive member 43 is subjected to a torque acting in the closure case closing direction by the axial elastic biasing force of the spring 5 and the cam action of the slope 66 of the cam face 61 even if the closure case 2 is released from the hand. The case 2 is closed to a fully closed position.

With the foldable portable telephone of the present invention, the closure case 2 in its closed state as shown in FIG. 1 is opened to the full-open position shown in FIG. 2 merely by pressing the manual button 41, i.e., by a very simple procedure. Incidentally, the closure case 2 can be opened also by grasping the case by hand without pressing the button 41 in the closed state of FIG. 1.

Further even when the position of engagement between the members 43, 44 of the foldable portable telephone of the present embodiment shifts to some extent, for example, owing to a temperature change with the closure case 2 in its closed state, the state of engagement shown in FIG. 6(a) is unlikely to alter to the state of engagement shown in FIG. 6(b) or 6(c), so that there is no likelihood of the closure case 2 opening inadvertently. The hinge assembly 4 is in the form of a unit obtained by incorporating the prime mover spring 5 and the cam faces 6, 61 for rotating the closure drive member 43 in the closure case opening or closing direction, the manual button 41 to be manipulated for opening the case 2, etc. into a hinge pin comprising the main body drive member 44 and the closure drive member 43. Accordingly, the assembly will not make the telephone greater in size, while the telephone can be assembled by the simple procedure of inserting the hinge assembly 4 into the barrel portions 13, 22 on the respective main body case 1 and closure case 2.

The torque exerted by the prime mover spring 5 with the closure case closed is received by the engagement of the cam face 6 of the closure drive member 43 and the cam face 61 of the main body drive member 44 without acting directly on the main body case 1 or the closure case 2. This eliminates the likelihood of deforming the case 1 or 2. Furthermore, the manual button 41 is easy to press if the head portion thereof is positioned as slightly projected from the cases. The head of the button 41 is formed with a smoothly curved surface, has no sharp projection and therefore assures safety.

Second Embodiment

Figure 7:
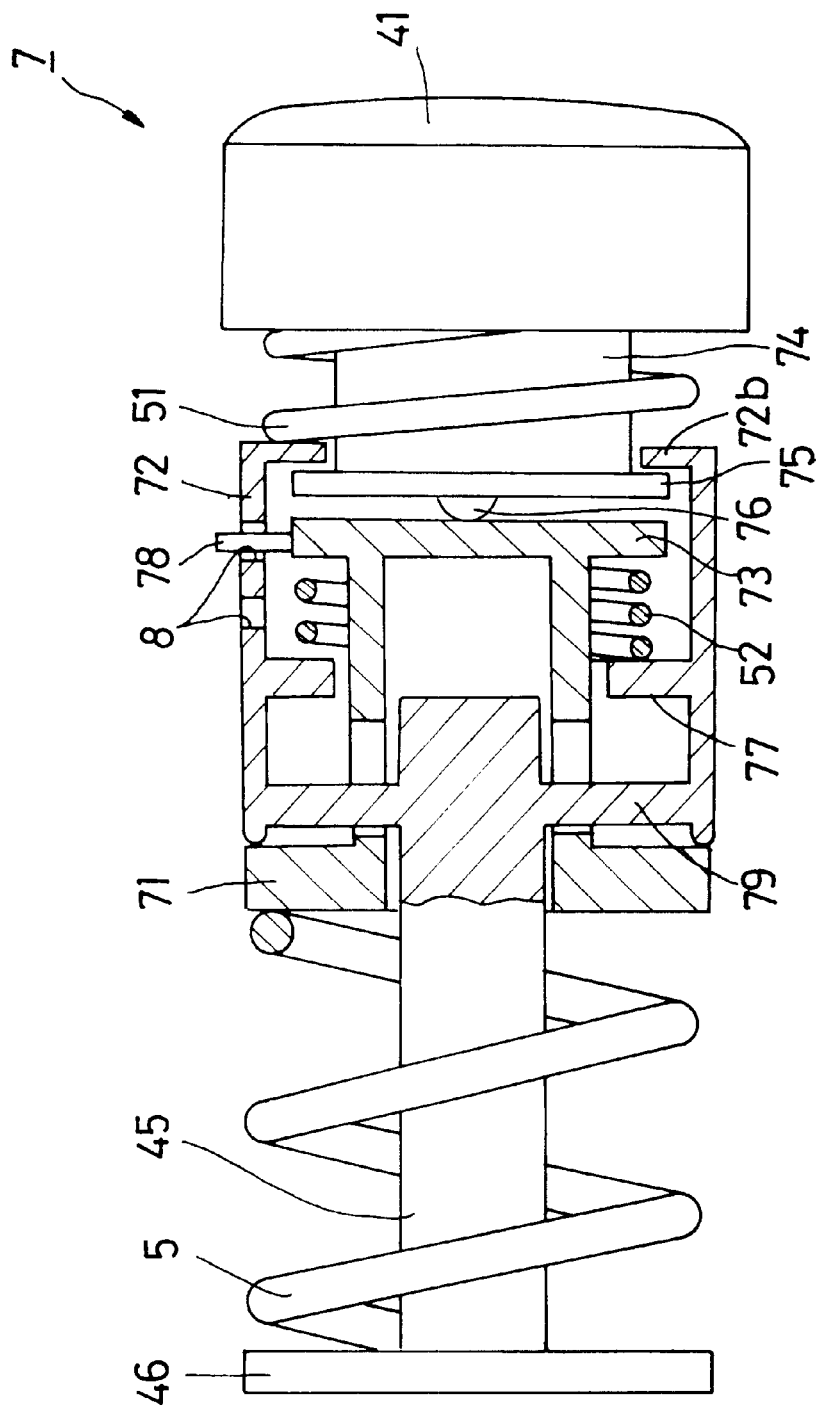
FIG. 7 is an enlarged front view partly broken away and showing a hinge assembly of a second embodiment.
Figure 8:
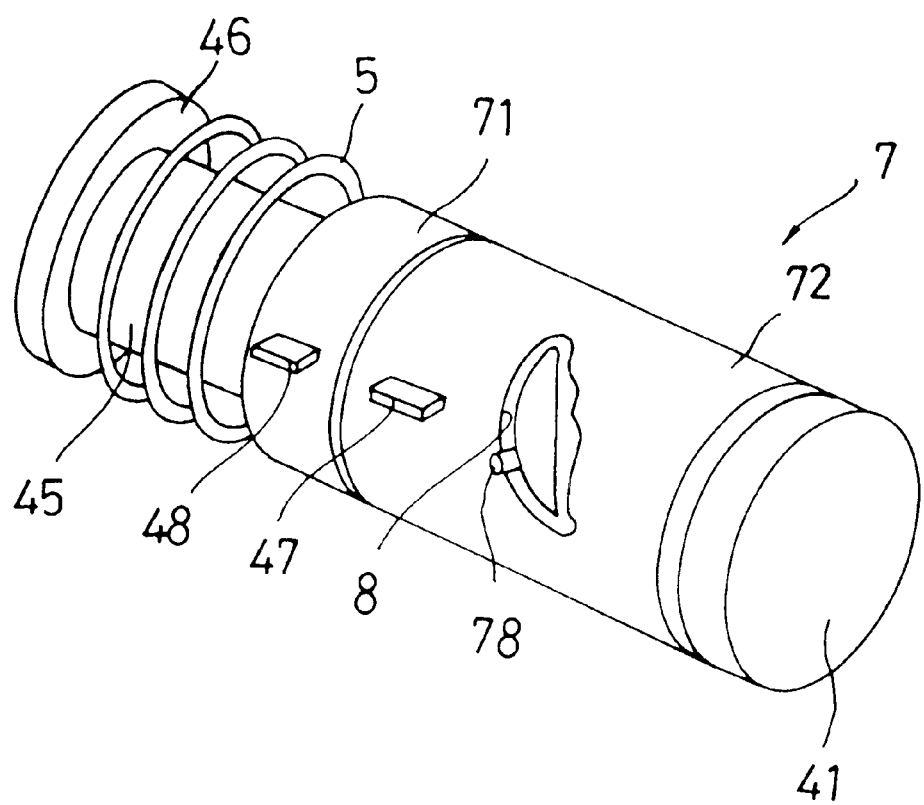
FIG. 8 is a perspective view of the hinge assembly of the second embodiment.

The foldable portable telephone of this embodiment has incorporated therein a hinge assembly 7 shown in FIGS. 7 and 8 in place of the hinge assembly 4 of FIG. 4 used in the first embodiment. Throughout FIGS. 4, 7 and 8, like members which are basically similar in function are designated by like reference numerals.

With reference to FIG. 8, the hinge assembly 7 is in the form of a round rod in its entirety and comprises a closure drive member 71 and a main body drive member 72 which are each in the form of a hollow cylinder, arranged coaxially and engaged with each other axially movably relative to each other and rotatably relative to each other. The main body drive member 72 has a peripheral wall provided with a cam slit 8, while the closure drive member 71 has a cam follower 78 projecting therefrom and extending through the cam slit 8 from inside to outside. The cam slit 8 is shaped as will be described later.

The closure drive member 71 is provided on its outer periphery with a pair of projections 48, 48 which are circumferentially spaced apart by a predetermined angle and engaged in the inner periphery of the first barrel portion 22 on the closure case 2 as in the first embodiment, whereby the closure drive member 71 is made rotatable with the closure case 2. Further the main body drive member 72 is provided on its outer periphery with a pair of projections 47, 47 which are circumferentially spaced apart by a predetermined angle and engaged in the inner periphery of the first barrel portion 13 on the main body case 1 as in the first embodiment, whereby the main body drive member 72 is made rotatable with the main body case 1.

With reference to FIG. 7, the closure drive member 71 has a disk 73 projecting from the right end thereof. The cam follower 78 is provided on the outer periphery of the disk 73.

On the other hand, the main body drive member 72 is provided on the inner surface of its peripheral wall with a connecting portion 79 at the left end thereof, a flange portion 72b at its right end and a ridge 77 at an intermediate portion thereof. Fixed to the center of the connecting portion 79 is a shank 45 extending leftward on the center axis of the main body drive member 72. A flange 46 in the form of a disk is provided at the left end of the shank 45. Provided around the shank 45 is a prime mover coil spring 5 having a left end fixed to the flange 46 of the shank 45 and a right end secured to the closure drive member 71. Consequently, the closure drive member 71 is biased by the spring 5 to rotate toward a direction to open the closure case 2.

A tubular member 74 extends through the flange portion 72b of the main body drive member 72 and has a right end with a manual button 41 secured thereto and a left end provided with a flange 75. A projection 76 is formed on the left side surface of the flange 75 centrally thereof and has an outer end bearing on the disk 73 of the closure drive member 71.

An auxiliary coil spring 51 is fitted around the tubular member 74 for biasing the button 41 toward a projecting direction, whereby the button 41 is held in a projected position in a free state. A second auxiliary spring 52 is provided around the central portion of the closure drive member 71 for biasing the disk 73 of the member 71 and the ridge 77 of the main body drive member 72 away from each other, whereby the cam follower 78 in a free state is pressed around the right side face of the slitted portion 8.

Figure 9:
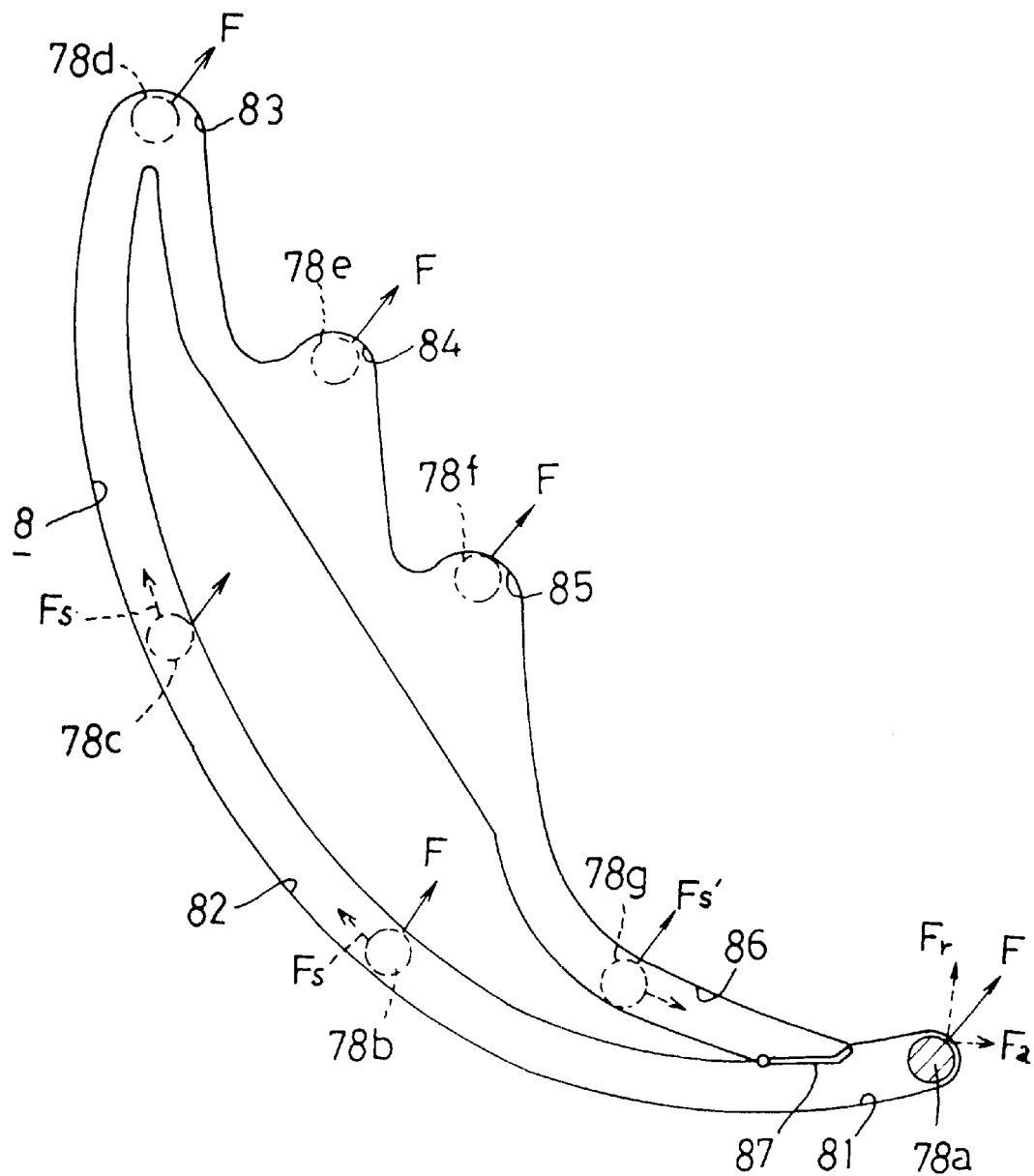
FIG. 9 is an enlarged front view of a cam slit formed in the hinge assembly.

With reference to FIG. 9, the cam slit 8 formed in the main body drive member 72 comprises a plurality of first to sixth cam slit portions 81 to 86 which are different in inclination with respect to the axial direction of the hinge assembly 7 and which communicate with one another to form a loop. The first cam slit portion 81 is generally in parallel to the axial direction. The cam follower 78a as positioned at the starting end of the slit portion 81 is subjected to a biasing force F which is the resultant of an axial force Fa and a force Fr in a direction of rotation which are exerted by the prime mover spring 5, whereby the follower is held pressed against the slit-defining wall. The second cam slit portion 82 extending from the first slit portion 81 is greatly inclined with respect to the axial direction. The cam follower 78b or 78c as positioned in this slit portion 82 is advanced therethrough by being subjected to a component Fs, in the direction along the slit portion 82, of the force F. The third cam slit portion 83 continuous with the second slit portion 82 is bent in an inverted U-shape. The cam follower 78d as positioned in this slit portion 83 is held pressed by the force F against the slit-defining wall. The fourth cam slit portion 84 continuous with the third slit portion 83 is bent in an inverted U-shape, and the cam follower 78e as positioned in this slit portion 84 is held pressed by the force F against the slit-defining wall. The fifth cam slit portion 85 continuous with the fourth slit portion 84 is bent in an inverted U-shape, and the cam follower 78f as positioned in this slit portion 85 is held pressed by the force F against the slit-defining wall. Further the sixth cam slit portion 86 is slightly inclined with respect to the axial direction, and the cam follower 78g as positioned in this slit portion 86 is advanced therethrough and eventually returned to the first cam slit portion 81 by being subjected to a component Fs', in the direction along the slit portion 86, of the force F.

When the closure case 2 is in the closed state, the cam follower 78 is positioned at the starting end of the first cam slit portion 81. When the manual button 41 is pressed in this state, the closure drive member 71 moves leftward, and the cam follower 78 advances through the first cam slit portion 81 with this movement. The closure case 2 remains almost closed during this process. Upon the cam follower 78 reaching the second cam slit portion 82, the cam follower 78 advances through the second cam slit portion 82 and reaches the third cam slit portion 83 under the action of the component Fs even if the manual button 41 is released from the hand. With the advance of the cam follower 78, the closure drive member 71 rotates in the closure case opening direction, and the cam follower 78 eventually reaches the third cam slit portion 83, whereby the closure case 2 is opened to a full-open position 2a shown in FIG. 11 and held in this position.

When the closure case 2 is thereafter pressed in the closing direction in order to close the case 2, the cam follower 78 advances toward the fourth cam slit portion 84 of the cam slit 8 and reaches a position close to the slit portion 84, whereupon the cam follower 78 falls into the fourth cam slit portion 84 under the action of the force F. Consequently, the closure case 2 is held in a posture 2b of first angle shown in FIG. 11.

When the closure case 2 is further pressed toward the closing direction, the cam follower moves out of the fourth cam slit portion 84, advances toward the fifth cam slit portion 85 and reaches a position in the vicinity of the slit portion 85, whereupon the force F causes the cam follower 78 to fall into the fifth cam slit portion 85. As a result, the closure case 2 is held in a posture 2c of second angle shown in FIG. 11.

When the closure case 2 is further pressed in the closing direction to completely close the case 2, the cam follower 78 moves out of the fifth cam slit portion 85, advancing toward the sixth cam slit portion 86. Upon reaching the slit portion 86, the cam follower 78 advances through this slit portion 86 and eventually returns to the starting end position 78a of the first cam slit portion 81 under the action of the component Fs' even if the case 2 is released from the hand. This movement of the cam follower 78 rotates the closure drive member 71 toward the closure case closing direction, and the case 2 is closed to the fully closed position and held in this position by the cam follower 78 reaching the starting end position of the first cam slit portion 81.

Figure 10:
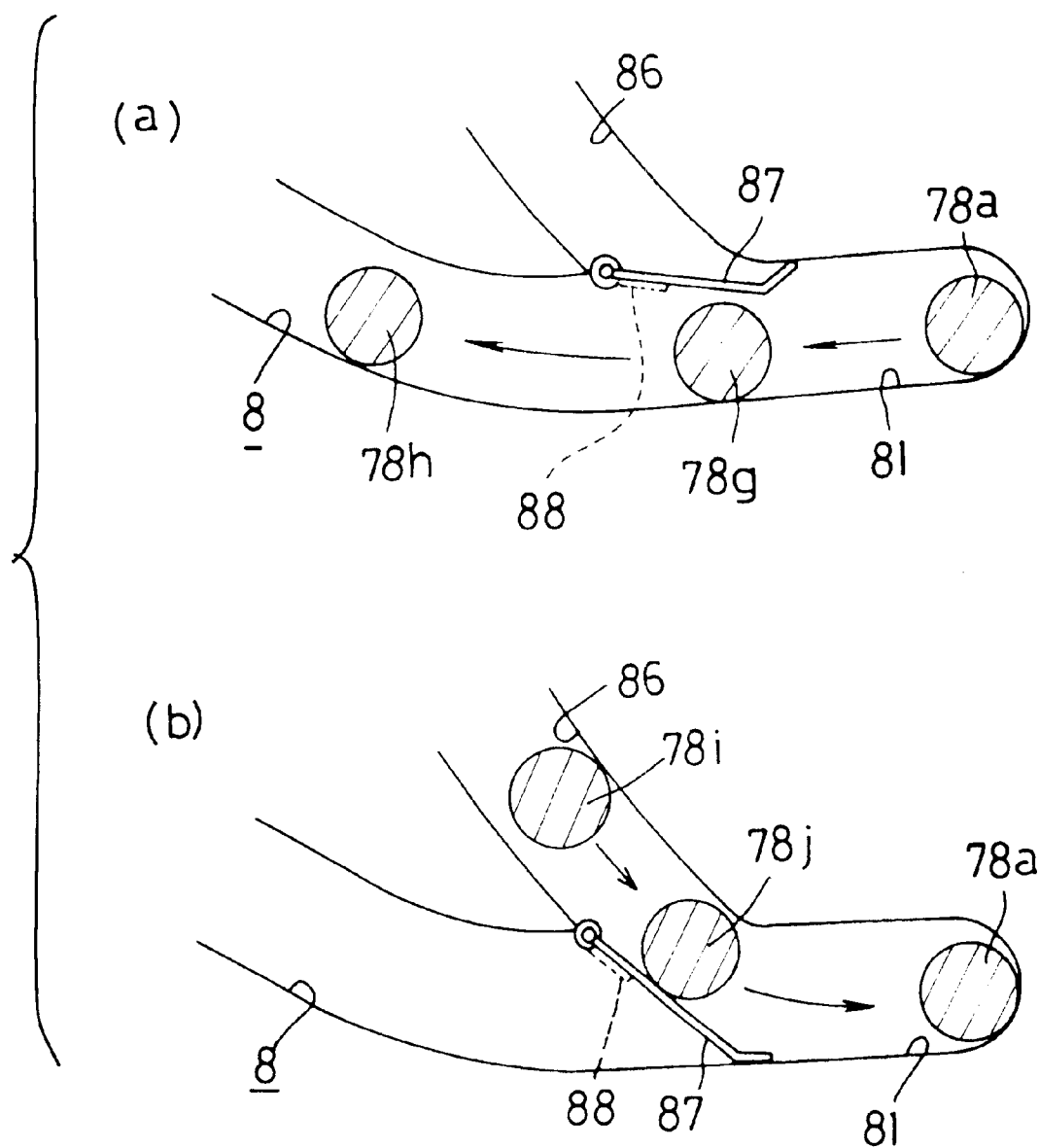
FIG. 10 includes diagrams for illustrating a valve member disposed in the cam slit.

A valve member 87 biased into rotation by a torsion spring 88 is disposed at the position where the sixth cam slit portion 86 of the cam slit 8 communicates with the first cam slit portion thereof as shown in FIGS. 10(a) and 10(b). The outlet of the slit portion 86 is usually closed. Accordingly, when the closure case 2 is opened by pressing the manual button 41, there is no likelihood that the cam follower 78a will be prevented by the valve member 87 from advancing from the starting end position of the first slit portion 81 as shown in FIG. 10(a), nor is it likely that the cam follower 78 will advance into the sixth slit portion 86. Further when the closure case 2 is closed, the cam follower 78 advancing through the sixth slit portion 86 pushes the valve member 87 open to enter the first slit portion 81 as shown in FIG. 10(b).

If the position of the members 71, 72 relative to each other is so adjusted that the cam follower 78 is disposed at a position a small distance forward from the starting end position of the first cam slit portion 81, with the closure case 2 in its closed state, the closure drive member 71 will be subjected to a rotational biasing force in the closure case closing direction when the case 2 is in the closed state, owing to the axial biasing force of the primer mover spring 5. The closure case 2 will then be closed as pressed into contact with the main body case 1. This provides a reliable closed state.

Figure 11:
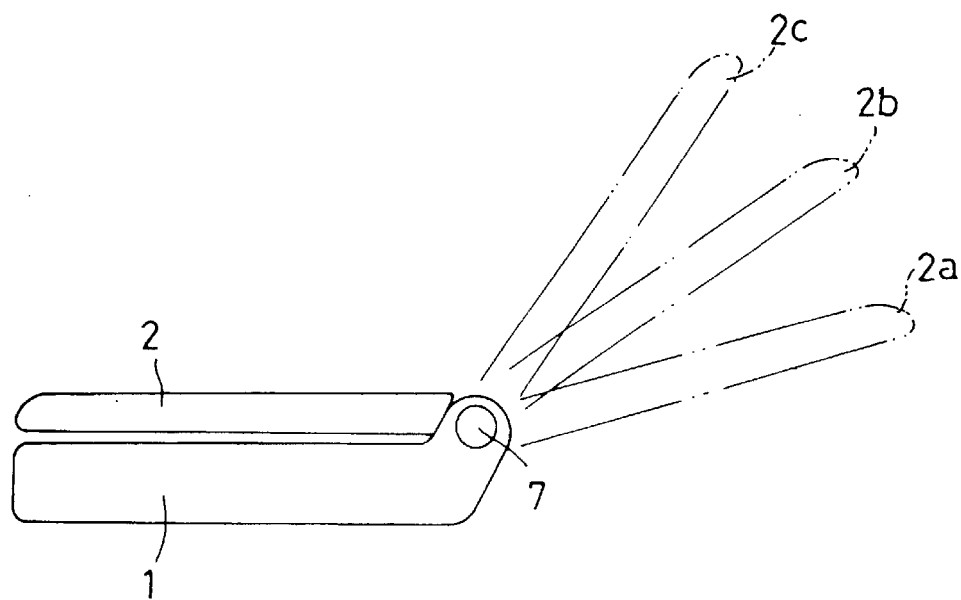
FIG. 11 is a side elevation for illustrating the operation of an opening angle adjusting mechanism used in the second embodiment.

The foldable portable telephone of the present embodiment not only has the same advantage as the first embodiment described but also permits the closure case 2 to be opened to different adjusted angles as shown in FIG. 11. Further when the manual button 41 is pressed with the closure case 2 set at an intermediate opening angle, the case 2 can be opened to the full-open position again. Furthermore, the configuration of the cam slit 8 shown in FIG. 9 makes it possible to smoothly close the closure case 2 from the full-open position to the fully closed position. The cam slit 8 need not always be in a loop form but can be a circular-arc form comprising the first cam slit portion 81 and the second cam slit portion 82 shown in FIG. 9, with a cam slit portion provided at an intermediate part of the second slit portion 82 to serve the functions of the fourth and fifth cam slit portions 84, 85.

Third Embodiment

The foldable portable telephone of this embodiment comprises a damper mechanism provided for the hinge assembly 7 of the second embodiment shown in FIG. 7, for reducing the closure case closing speed after an intermediate stage of the process of opening the closure case 2.

Figure 12:
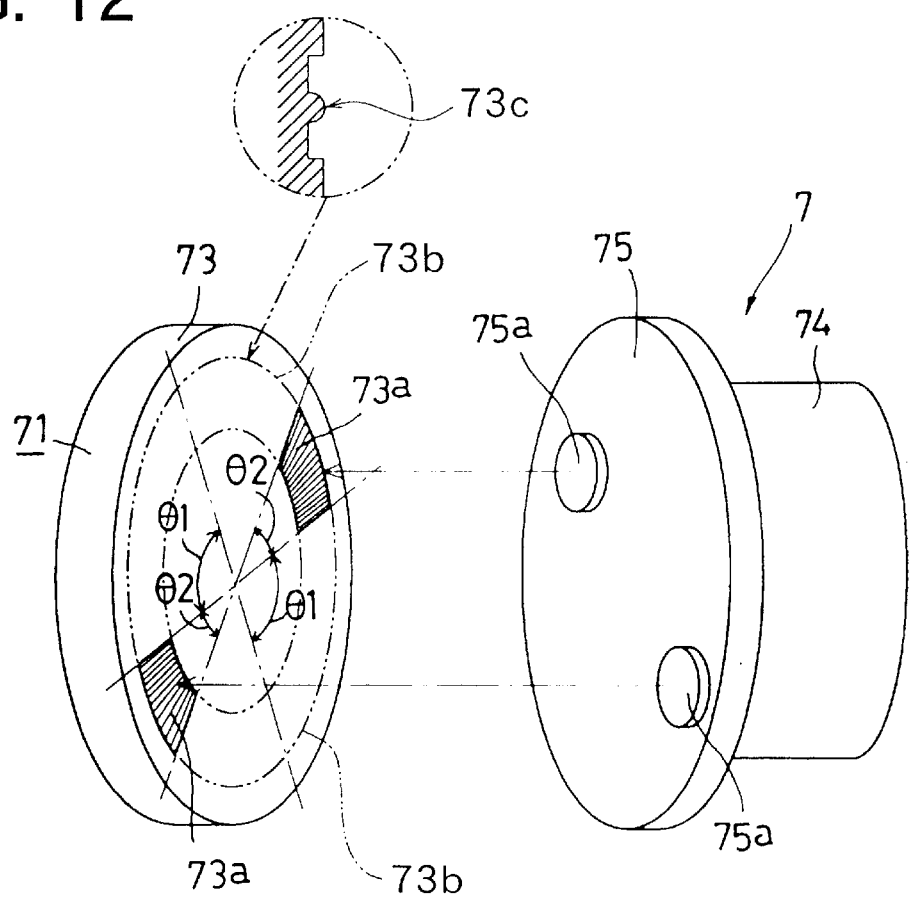
FIG. 12 is a perspective view of a damper mechanism incorporated in another foldable portable telephone as a third embodiment.

Stated more specifically with reference to FIG. 12 showing this embodiment, the disk 73 of the closure drive member 71 is provided on its right side face with a pair of frictional resistance portions 73a, 73a having a phase difference of 180 degrees, and the flange 75 of the tubular member 74 is provided on its left side face with a pair of disklike protrusions 75a, 75a having a phase difference of 180 degrees and slidable in contact with the frictional resistance portions 73a, 73a. The frictional resistance portions 73a, 73a can be provided by forming minute surface irregularities on the disk 73 or affixing felt members to the disk. The closure drive member 71 is provided on circular-arc regions 73b between the pair of frictional resistance portions 73a, 73a with respective ridges 73c having a semicircular cross section and slidable in contact with the protrusions 75a, 75a. In this arrangement, the disk 73 of the closure drive member 71 rotates with the opening movement of the closure case 2, whereas the flange 75 of the tubular member 74 remains at rest, whereby the disk 73 and the flange 75 are rotated relative to each other. Alternatively, the pair of protrusions 75a, 75a can be formed on the disk 73 of the closure drive member 71, with the pair of frictional resistance portions 73a, 73a provided on the flange 75 of the tubular member 74.

Figure 13:
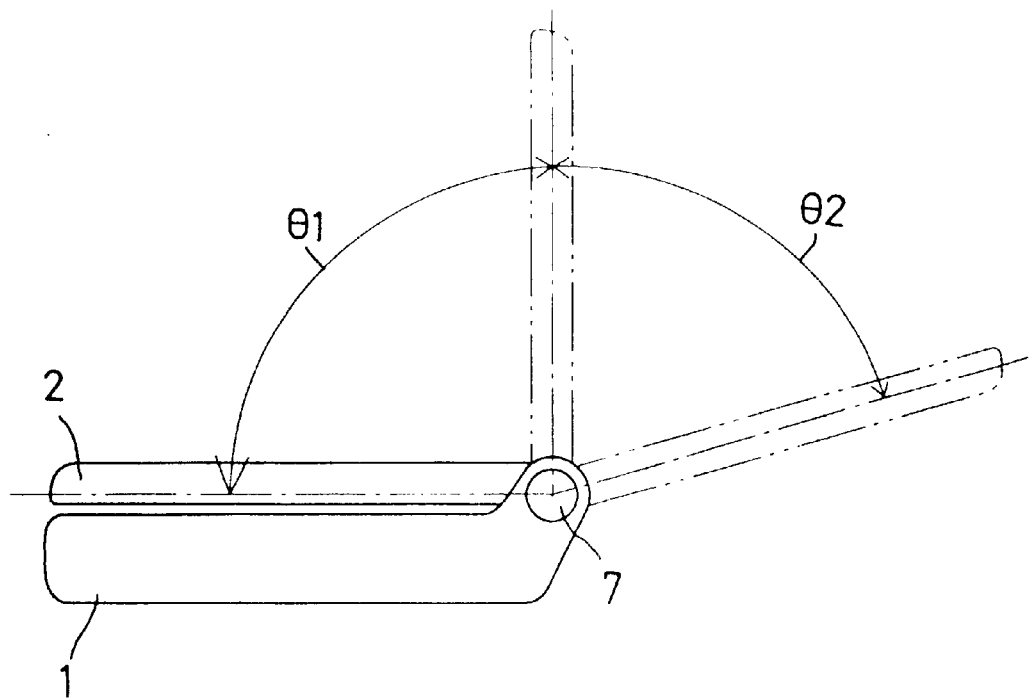
FIG. 13 is a side elevation for illustrating an angular range wherein the damper mechanism operates.

Over the angular range θ1 (about 90 degrees) of rotation in the first half of the process of opening the closure case 2 from the fully closed position to the full-open position shown in FIG. 13, the frictional resistance portions 73a, 73a of the closure drive member 71 are held out of contact with the protrusions 75a, 75a of the tubular member 74 but the ridge 73c is in sliding contact with the protrusion 75a which offers reduced frictional resistance, so that the closure case 2 is opened at a relatively high speed by the rotational biasing force of the prime mover spring 5. Subsequently in the angular range θ2 (about 75 degrees) of rotation in the second half, the frictional resistance portions 73a, 73a of the closure drive member 71 come into contact with the protrusions 75a, 75a of the tubular member 74 to apply a braking force to the rotation of the case 2. As a result, the closure case 2 is opened to the full-open position at a relatively low speed.

According to the present embodiment, speed of opening of the closure case 2 is reduced at an intermediate stage of opening, so that the impact to be produced upon the case 2 reaching the full-open position is diminished even if the case 2 has a large display 21 and a great weight. This obviates the likelihood that the telephone will slip off the hand to fall owing to the impact to be produced upon the opening of the closure case 2, even if the main body case 1 is grasped with a relatively small force.

The damper mechanism described can be incorporated into the hinge assembly 4 of the first embodiment. The damper mechanism, which utilizes frictional resistance, can alternatively be of various other known constructions, such as one utilizing the flow resistance of a liquid. Furthermore, the location where the damper mechanism is provided is not limited to that of the above embodiment; the mechanism can be positioned at a desired location where a closure-side member rotatable or movable with the closure case 2 is opposed to a body-side member rotatable or movable with the main body case 1.

Fourth Embodiment

Figure 14:
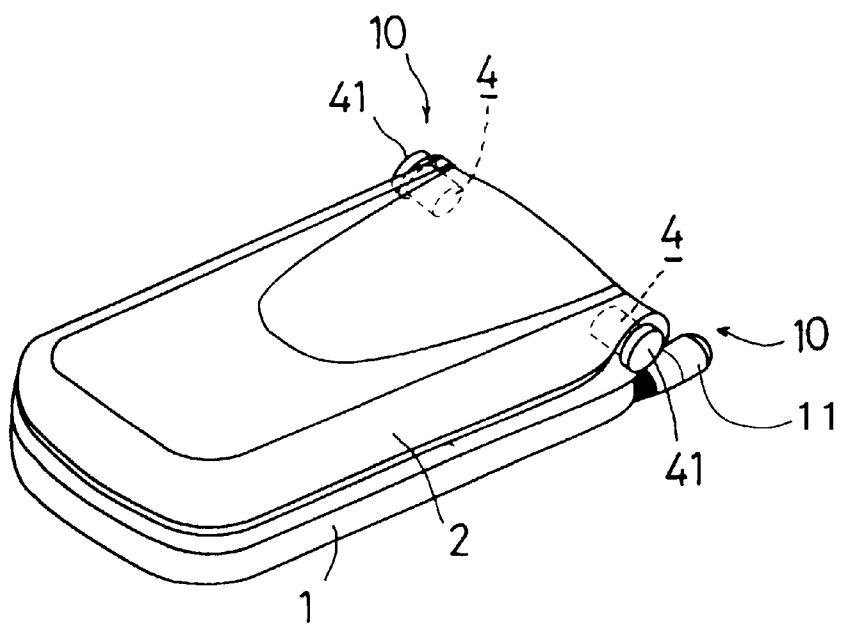
FIG. 14 is a perspective view of another foldable portable telephone as a fourth embodiment, with a closure case closed.
Figure 15:
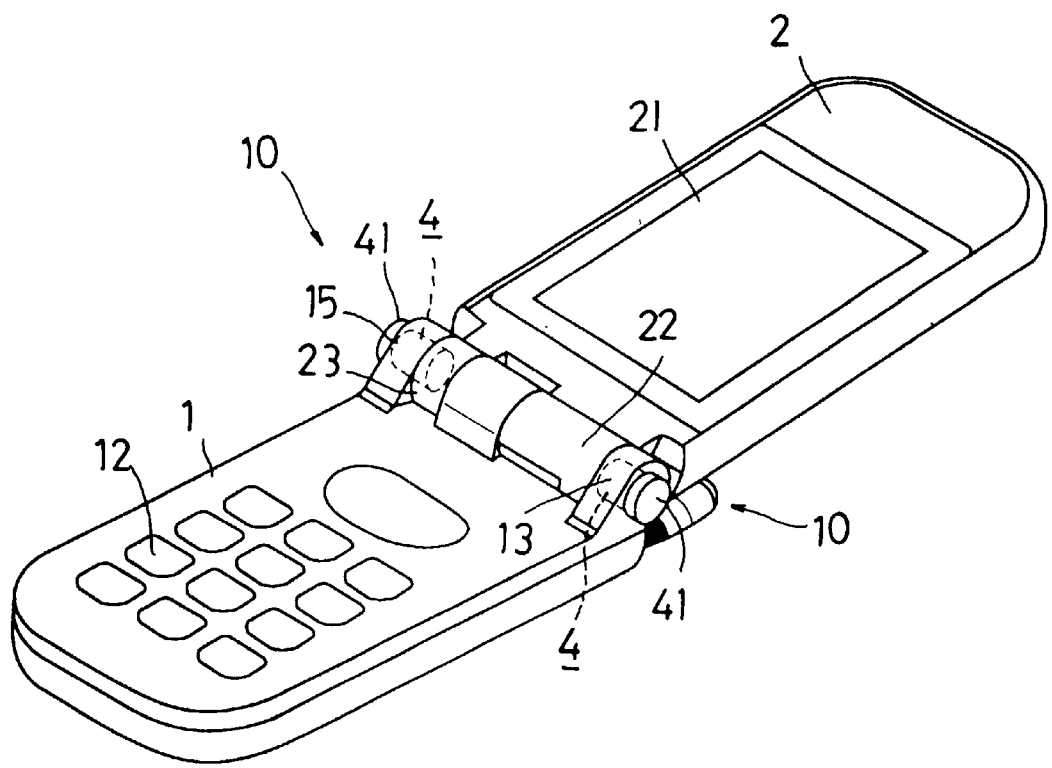
FIG. 15 is a perspective view of the foldable portable telephone of the fourth embodiment, with the closure case opened.
Figure 16:
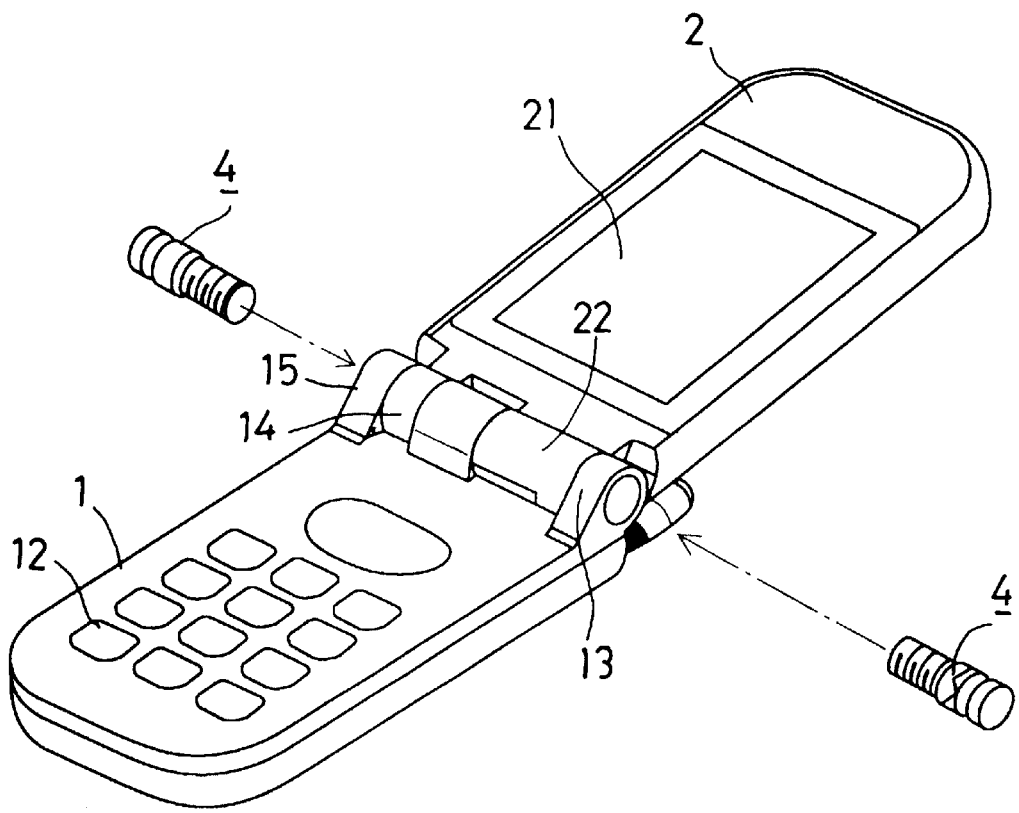
FIG. 16 is a perspective view of the foldable portable telephone of the fourth embodiment, with a pair of hinge assemblies separated therefrom.
Figure 17:
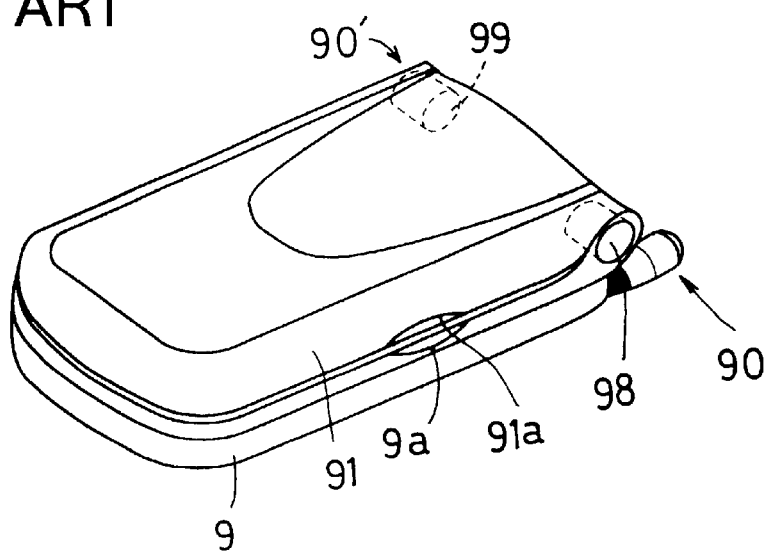
FIG. 17 is a perspective view showing a conventional foldable portable telephone, with a closure case closed.
Figure 18:
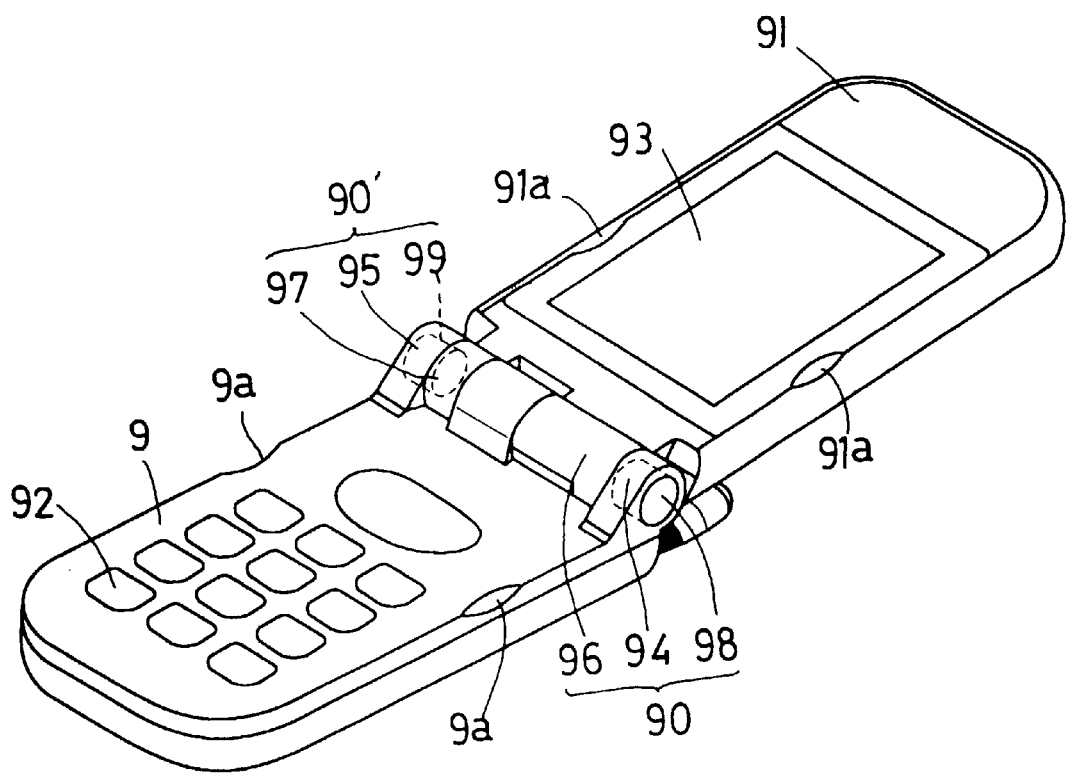
FIG. 18 is a perspective view showing the conventional foldable portable telephone, with the closure case opened.
Figure 19:
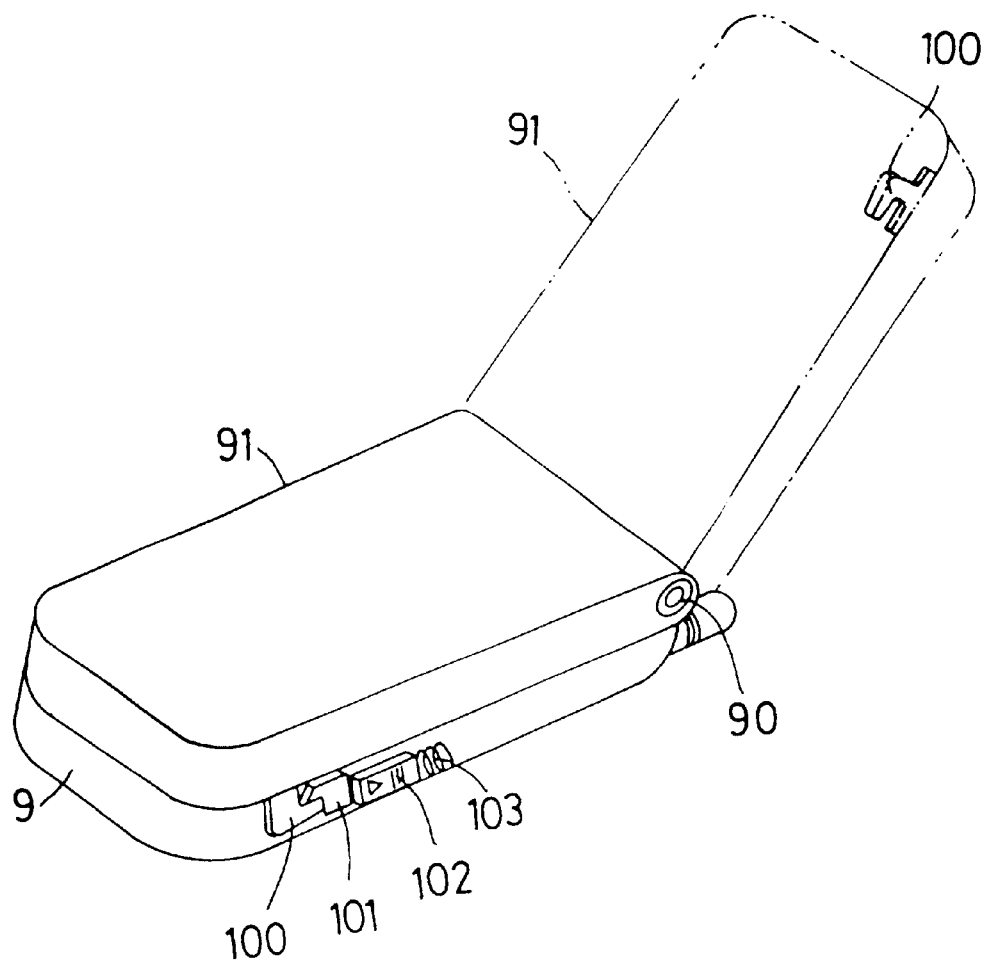
FIG. 19 is a perspective view of a foldable portable telephone devised by the present applicant in the course of accomplishment of the present invention.

With reference to FIGS. 14 to 16, the foldable portable telephone of this embodiment has a pair of hinge mechanisms 10, 10 arranged respectively at the left and right sides of the junction of a main body case 1 and a closure case 2. The hinge assembly 4 of the first embodiment shown in FIG. 4 is used as it is in the hinge mechanism 10 at the right, while the hinge mechanisms 10, 10 at the left and at the right are in symmetry. Incidentally, the hinge assembly 7 of the second or third embodiment is usable in place of the hinge assembly 4 of the first embodiment.

The main body case 1 is provided with a first barrel portion 13 and a second barrel portion 15 which are cylindrical, while the closure case 2 is provided with a first barrel portion 22 and a second barrel portion 23 which are cylindrical, the barrel portions being aligned. The hinge assembly 4 constituting the hinge mechanism 10 at the right is fitted in the first barrel portion 13 on the main body case 1 and the first barrel portion 22 on the closure case 2, with the main body drive member 44 in engagement with the inner periphery of the first barrel portion 13 of the case 1 and with the closure drive member 43 in engagement with the inner periphery of the first barrel portion 22 of the case 2. The hinge assembly 4 constituting the hinge mechanism 10 at the left is fitted in the second barrel portion 15 on the main body case 1 and the second barrel portion 23 on the closure case 2, with the main body drive member 44 in engagement with the inner periphery of the second barrel portion 15 of the case 1 and with the closure drive member 43 in engagement with the inner periphery of the second barrel portion 23 of the case 2. The manual buttons 41, 41 of the two hinge mechanisms 10, 10 are exposed at the respective opposite sides of the main body case 1.

With the foldable portable telephone of the present embodiment, the two hinge assemblies 4, 4 are operated to open the closure case 2, by pressing the pair of opposite manual buttons 41, 41 at the same time. Accordingly even if one of the manual buttons 41 is depressed while the telephone is being carried as placed in a bag or the like, the closure case 2 remains closed, hence safety. Since the pair of hinge assemblies 4, 4 exert rotational forces respectively on opposite sides of the closure case 2, sufficient torque is available as required for opening the case 2 even if the case 2 has a large display 21 and is therefore given an increased weight.

The closure case 2 is opened by pressing the pair of opposite manual buttons 41, 41 from opposite sides. This invariably increases the force for grasping the main body case 1, consequently obviating the likelihood that the telephone will slip off owing to the impact produced when the closure case 2 opens. Further in opening the closure case 2 by manipulating the pair of manual buttons 41, 41, there is no likelihood that the hand will touch the antenna 11 provided on the main body case 1 as seen in FIG. 14 to impair the performance of the antenna. In addition, the present embodiment of course has the same advantage as the first embodiment.

What is claimed is:

1. A foldable portable telephone comprising a main body case provided with a plurality of manual keys, and a closure case connected to the main body case by a hinge mechanism for covering the manual keys, the telephone being characterized in that the hinge mechanism comprises cylindrical barrel portions provided respectively on the main body case and the closure case and arranged in alignment, and a hinge assembly in the form of a round rod and extending through the barrel portions centrally thereof, the hinge assembly comprising:

a main body drive member in engagement with the barrel portion on the main body case and nonrotatable relative thereto, a closure drive member in engagement with the barrel portion on the closure case and nonrotatable relative thereto, a prime mover mechanism provided between the main body drive member and the closure drive member for exerting a force for rotating the closure drive member in a direction to open the closure case, a holding mechanism for holding the closure case closed in a closed position, a manual button exposed to outside from the barrel portions on the main body case and the closure case and to be manipulated to open the closure case, a hold release mechanism for releasing the holding mechanism from the holding state in response to the manipulation of the manual button, wherein a cam mechanism is formed in engaging portions of the main body drive member and the closure drive member, and an elastic member is provided between the main body drive member and the closure drive member for exerting a force for rotating the closure drive member in the closure case opening direction, the cam mechanism having a first cam curve portion and a second cam curve portion operable respectively in the first half and the second half of the process of rotation of the closure case from the closed position to an open position, the first cam curve portion being in the form of a cam curve capable of rotating the closure drive member in a direction to close the closure case with the force exerted by the elastic member, the second cam curve portion being in the form of a cam curve capable of rotating the closure drive member in the closure case opening direction with the force exerted by the elastic member, the first cam curve portion and the elastic member providing the holding mechanism, the second cam curve portion and the elastic member providing the prime mover mechanism, the cam mechanism being changeable from the first cam curve portion operating state by manipulating the manual button.

2. A foldable portable telephone comprising a main body case provided with a plurality of manual keys, and a closure case connected to the main body case by a pair of hinge mechanisms arranged in alignment for covering the manual keys, the telephone being characterized in that one of the hinge mechanisms comprises a main body drive member connected to an end portion of the main body case, a closure drive member connected to an end portion of the closure case, a cam mechanism formed in engaging portions of the main body drive member and the closure drive member, an elastic member provided between the main body drive member and the closure drive member for exerting a force for rotating the closure drive member in a direction to open the closure case, a manual button to be manipulated to open the closure case, and a manipulating force transmitting member for transmitting the manipulating force on the manual button to the cam mechanism, the cam mechanism having a first cam curve portion and a second cam curve portion operable respectively in the first half and the second half of the process of rotation of the closure case from a closed position to an open position, the first cam curve portion being in the form of a cam curve capable of rotating the closure drive member in a direction to close the closure case with the force exerted by the elastic member, the second cam curve portion being in the form of a cam curve capable of rotating the closure drive member in the closure case opening direction with the force exerted by the elastic member, the cam mechanism being changeable from the first cam curve portion operating state to the second cam curve portion operating state by manipulating the manual button.

3. A foldable portable telephone according to claim 2 wherein the main body case and the closure case are provided respectively with cylindrical barrel portions arranged in alignment with each other, and the main body drive member, the closure drive member, the cam mechanism, the elastic member, the manual button and the manipulating force transmitting member are brought together into a hinge assembly in the form of a round rod, the hinge assembly being fitted in the barrel portions on the main body case and the closure case, the main body drive member being in engagement with the barrel portion on the main body case nonrotatably relative thereto, the closure drive member being in engagement with the barrel portion on the closure case nonrotatably relative thereto, the manual button being exposed to outside from the main body case barrel portion.

4. A foldable portable telephone according to claim 3 wherein the closure drive member and the main body drive member are each in the form of a hollow cylinder, fitted to each other, axially movable relative to each other and rotatable relative to each other, a prime mover spring being provided between the closure drive member and the main body drive member to serve as the elastic member, cam faces being slidable in contact with each other and formed in opposed portions of the closure drive member and the main body drive member to provide the cam mechanism, the cam faces being provided with the first cam curve portion and the second cam curve portion, the prime mover spring having an elastic force for pressing the cam faces into contact with each other axially thereof and giving a force for rotating the closure drive member in the closure case opening direction, the manual button being connected to the closure drive member by the manipulating force transmitting member, the axial pressing contact force at the first cam curve portion of the cam faces being reducible by manipulating the manual button to thereby axially press the closure drive member.

5. A foldable portable telephone according to claim 3 wherein the closure drive member and the main body drive member are each in the form of a hollow cylinder, fitted to each other, axially movable relative to each other and rotatable relative to each other, a prime mover spring being provided between the closure drive member and the main body drive member to serve as the elastic member, the cam mechanism being provided by a cam slit formed in the main body drive member and a cam follower formed on the closure drive member and engaged in the cam slit, the cam slit being provided with the first cam curve portion and the second cam curve portion, the prime mover spring having an elastic force for giving a force for rotating the closure drive member and the main body drive member relative to each other, the manual button being connected to the closure drive member by the manipulating force transmitting member, the cam follower being movable from the first cam curve portion of the cam slit to the second cam curve portion thereof by manipulating the manual button to thereby press the closure drive member axially thereof.

6. A foldable portable telephone comprising a main body case provided with a plurality of manual keys, and a closure case connected to the main body case by a pair of hinge mechanisms arranged alignment for covering the manual keys, the telephone being characterized in that each of the hinge mechanisms comprises:

a main body drive member connected to an end portion of the main body case and rotatable with the main body case, a closure drive member connected to an end portion of the closure case and rotatable with the closure case, a prime mover mechanism provided between the main body drive member and the closure drive member for exerting a force for rotating the closure drive member in a direction to open the closure case, a holding mechanism for holding the closure case closed in a closed position, a manual button to be manipulated to open the closure case, and a hold release mechanism for releasing the holding mechanism from the holding state in response to the manipulation of the manual button.

7. A foldable portable telephone comprising a main body case provided with a plurality of manual keys, and a closure case connected to the main body case by a pair of hinge mechanisms arranged alignment for covering the manual keys, the telephone being characterized in that each of the hinge mechanisms comprises a main body drive member connected to an end portion of the main body case, a closure drive member connected to an end portion of the closure case, a cam mechanism formed in engaging portions of the main body drive member and the closure drive member, an elastic member provided between the main body drive member and the closure drive member for exerting a force for rotating the closure drive member in a direction to open the closure case, a manual button to be manipulated to open the closure case, and a manipulating force transmitting member for transmitting the manipulating force on the manual button to the cam mechanism, the cam mechanism having a first cam curve portion and a second cam curve portion operable respectively in the first half and the second half of the process of rotation of the closure case from a closed position to an open position, the first cam curve portion being in the form of a cam curve capable of rotating the closure drive member in a direction to close the closure case with the force exerted by the elastic member, the second cam curve portion being in the form of a cam curve capable of rotating the closure drive member in the closure case opening direction with the force exerted by the elastic member, the cam mechanism being changeable from the first cam curve portion operating state to the second cam curve portion operating state by manipulating the manual button.

8. A foldable portable telephone according to claim 7 wherein the main body case is provided with a first barrel portion and a second barrel portion each in the form of a cylinder, while the closure case is provided with a first barrel portion and a second barrel portion each in the form of a cylinder, the barrel portions being arranged in alignment, the main body drive member, the closure drive member, the cam mechanism, the elastic member, the manual button and the manipulating force transmitting member which constitute each hinge mechanism being brought together into a hinge assembly in the form of a round rod, the hinge assembly providing one of the hinge mechanisms being fitted in the first barrel portions on the main body case and the closure case, the hinge assembly providing the other hinge mechanisms being fitted in the second barrel portions on the main body case and the closure case, the manual buttons of the two hinge mechanisms being exposed at opposite sides of the main body case.

9. A foldable portable telephone according to claim 8 wherein the closure drive member and the main body drive member which constitute each hinge assembly are each in the form of a hollow cylinder, fitted to each other, axially movable relative to each other and rotatable relative to each other, a prime mover spring being provided between the closure drive member and the main body drive member to serve as the elastic member, cam faces being slidable in contact with each other and formed in opposed portions of the closure drive member and the main body drive member to provide the cam mechanism, the cam faces being provided with the first cam curve portion and the second cam curve portion, the prime mover spring having an elastic force for pressing the cam faces into contact with each other axially thereof and giving a force for rotating the closure drive member in the closure case opening direction, the manual button being connected to the closure drive member by the manipulating force transmitting member, the axial pressing contact force at the first cam curve portion of the cam faces being reducible by manipulating the manual button to thereby axially press the closure drive member.

10. A foldable portable telephone according to claim 8 wherein the closure drive member and the main body drive member which constitute each hinge assembly are each in the form of a hollow cylinder, fitted to each other, axially movable relative to each other and rotatable relative to each other, a prime mover spring being provided between the closure drive member and the main body drive member to serve as the elastic member, the cam mechanism being provided by a cam slit formed in the main body drive member and a cam follower formed on the closure drive member and engaged in the cam slit, the cam slit being provided with the first cam curve portion and the second cam curve portion, the prime mover spring having an elastic force for giving a force for rotating the closure drive member and the main body drive member relative to each other, the manual button being connected to the closure drive member by the manipulating force transmitting member, the cam follower being movable from the first cam curve portion of the cam slit to the second cam curve portion thereof by manipulating the manual button to thereby press the closure drive member axially thereof.

11. A foldable portable telephone comprising a main body case provided with a plurality of manual kOeys, and a closure case connected to the main body case by a pair of hinge mechanisms arranged in alignment for covering the manual keys, the telephone being characterized in that each of the hinge mechanisms comprises cylindrical barrel portions provided respectively on the main body case and the closure case and arranged in alignment, and a hinge assembly in the form of a round rod and extending through the barrel portions centrally thereof, the hinge assembly comprising:

a main body drive member in engagement with the barrel portion on the main body case and nonrotatable relative thereto, a closure drive member in engagement with the barrel portion on the closure case and nonrotatable relative thereto, a prime mover mechanism provided between the main body drive member and the closure drive member for exerting a force for rotating the closure drive member in a direction to open the closure case, a holding mechanism for holding the closure case closed in a closed position, a manual button exposed to outside from the barrel portions on the main body case and the closure case and to be manipulated to open the closure case, a hold release mechanism for releasing the holding mechanism from the holding state in response to the manipulation of the manual button, and a damper mechanism for applying a braking force to the rotation of the closure case in the second half of the process of opening the closure case.

12. A foldable portable telephone comprising a main body case provided with a plurality of manual keys, and a closure case connected to the main body case by a pair of hinge mechanisms arranged in alignment for covering the manual keys, the telephone being characterized in that at least one of the hinge mechanisms comprises cylindrical barrel portions provided respectively on the main body case and the closure case and arranged in alignment, and a hinge assembly in the form of a round rod and extending through the barrel portions centrally thereof, the hinge assembly comprising:

a main body drive member in engagement with the barrel portion on the main body case and nonrotatable relative thereto, a closure drive member in engagement with the barrel portion on the closure case and nonrotatable relative thereto, a prime mover mechanism provided between the main body drive member and the closure drive member for exerting a force for rotating the closure drive member in a direction to open the closure case, a holding mechanism for holding the closure case closed in a closed position, a manual button exposed to outside from the barrel portions on the main body case and the closure case and to be manipulated to open the closure case, a hold release mechanism for releasing the holding mechanism from the holding state in response to the manipulation of the manual button, and a damper mechanism for applying a braking force to the rotation of the closure case in the second half of the process of opening the closure case, wherein a cam mechanism is formed in engaging portions of the main body drive member and the closure drive member, and an elastic member is provided between the main body drive member and the closure drive member for exerting a force for rotating the closure drive member in the closure case opening direction, the cam mechanism having a first cam curve portion and a second cam curve portion operable respectively in the first half and the second half of the process of rotation of the closure case from the closed position to an open position, the first cam curve portion being in the form of a cam curve capable of rotating the closure drive member in a direction to close the closure case with the force exerted by the elastic member, the second cam curve position being in the form of a cam curve capable of rotating the closure drive member in the closure case opening direction with the force exerted by the elastic member, the first cam curve portion and the elastic member providing the holding mechanism, the second cam curve portion and the elastic member providing the prime mover mechanism, the cam mechanism being changeable from the first cam curve portion operating state to the second cam curve portion operating state by manipulating the manual button.

13. A foldable portable telephone comprising a main body case provided with manual keys, and a closure case connected to the main body case by a hinge mechanism for covering the manual keys, the telephone being characterized in that the hinge mechanism comprises:

a main body drive member connected to an end portion of the main body case and rotatable with the main body case, a closure drive member connected to an end portion of the closure case and rotatable with the closure case, a prime mover mechanism provided between the main body drive member and the closure drive member for exerting a force for rotating the closure drive member in a direction to open the closure case, a holding mechanism for holding the closure case closed in a closed position, a manual button to be manipulated to open the closure case, a hold release mechanism for releasing the holding mechanism from the holding state in response to the manipulation of the manual button, and an opening angle adjusting mechanism for holding the closure case at one of a plurality of opening angles in the process of closing the closure case from a full-open position, wherein upon deviation of the closure case from said one of a plurality of opening angles, a restoring force acts to return the closure case to said opening angle.

14. A foldable portable telephone comprising a main body case provided with a plurality of manual keys, and a closure case connected to the main body case by a hinge mechanism for covering the manual keys, the telephone being characterized in that the hinge mechanism comprises a main body drive member connected to an end portion of the main body case, a closure drive member connected to an end portion of the closure case, a cam mechanism formed in engaging portions of the main body drive member and the closure drive member, an elastic member provided between the main body drive member and the closure drive member for exerting a force for rotating the closure drive member in a direction to open the closure case, a manual button to be manipulated to open the closure case, and a manipulating force transmitting member for transmitting the manipulating force on the manual button to the cam mechanism, the cam mechanism having a first cam curve portion and a second cam curve portion operable respectively in the first half and the second half of the process of rotation of the closure case from a closed position to an open position and a third cam curve portion operable in the process of rotation of the closure case from the open position to the closed position, the first cam curve portion being in the form of a cam curve capable of rotating the closure drive member in a direction to close the closure case with the force exerted by the elastic member, the second cam curve portion being in the form of a cam curve capable of rotating the closure drive member in the closure case opening direction with the force exerted by the elastic member, the third cam curve portion being in the form of a cam curve capable of holding the closure case at one or a plurality of opening angles with the force exerted by the elastic member, the cam mechanism being changeable from the first cam curve portion operating state to the second cam curve portion operating state by manipulating the manual button.

15. A foldable portable telephone according to claim 14 wherein the main body case and the closure case are provided respectively with cylindrical barrel portions arranged in alignment with each other, and the main body drive member, the closure drive member, the cam mechanism, the elastic member, the manual button and the manipulating force transmitting member are brought together into a hinge assembly in the form of a round rod, the hinge assembly being fitted in the barrel portions on the main body case and the closure case, the main body drive member being in engagement with the barrel portion on the main body case nonrotatably relative thereto, the closure drive member being in engagement with the barrel portion on the closure case nonrotatably relative thereto, the manual button being exposed to outside from the main body case barrel portion.

16. A foldable portable telephone according to claim 14 wherein the closure drive member and the main body drive member are each in the form of a hollow cylinder, fitted to each other, axially movable relative to each other and rotatable relative to each other, a prime mover spring being provided between the closure drive member and the main body drive member to serve as the elastic member, the cam mechanism being provided by a cam slit formed in the main body drive member and a cam follower formed on the closure drive member and engaged in the cam slit, the cam slit being provided with the first cam curve portion, the second cam curve portion and the third cam curve portion, the prime mover spring having an elastic force for giving a force for rotating the closure drive member and the main body drive member relative to each other, the manual button being connected to the closure drive member by the manipulating force transmitting member, the cam follower being movable from the first cam curve portion of the cam slit to the second cam curve portion thereof by manipulating the manual button to thereby press the closure drive member axially thereof.

17. A foldable portable telephone according to claim 16 wherein the cam slit is formed by joining the first cam curve portion, the second cam curve portion and the third cam curve portion into a loop, and the third cam curve portion has a second half in the form of a cam curve capable of rotating the closure drive member in the closure case closing direction with the force exerted by the elastic member.

* * * * *